(12) United States Patent
Pesonen et al.

(10) Patent No.: US 11,989,919 B2
(45) Date of Patent: May 21, 2024

(54) METHOD AND APPARATUS FOR ENCODING AND DECODING VOLUMETRIC VIDEO DATA

(71) Applicant: Nokia Technologies Oy, Espoo (FI)

(72) Inventors: Mika Pesonen, Tampere (FI);
Sebastian Schwarz, Tampere (FI);
Vida Fakour Sevom, Tampere (FI)

(73) Assignee: Nokia Technologies Oy, Espoo (FI)

( * ) Notice: Subject to any disclaimer, the term of this patent is extended or adjusted under 35 U.S.C. 154(b) by 750 days.

(21) Appl. No.: 17/051,820

(22) PCT Filed: May 7, 2019

(86) PCT No.: PCT/FI2019/050352
§ 371 (c)(1),
(2) Date: Oct. 30, 2020

(87) PCT Pub. No.: WO2019/215388
PCT Pub. Date: Nov. 14, 2019

(65) Prior Publication Data
US 2021/0241496 A1    Aug. 5, 2021

Related U.S. Application Data

(60) Provisional application No. 62/668,901, filed on May 9, 2018.

(51) Int. Cl.
*G06T 9/00*        (2006.01)
*G06T 5/00*        (2006.01)
(Continued)

(52) U.S. Cl.
CPC ................ *G06T 9/001* (2013.01); *G06T 5/00* (2013.01); *H04N 19/137* (2014.11); *H04N 19/176* (2014.11); *H04N 19/597* (2014.11)

(58) Field of Classification Search
CPC .. H04N 19/137; H04N 19/176; H04N 19/597; G06T 5/00; G06T 9/001
See application file for complete search history.

(56) References Cited

U.S. PATENT DOCUMENTS

2017/0310945 A1  10/2017 Juang et al.
2017/0347122 A1*  11/2017 Chou .................... G06T 17/005
(Continued)

FOREIGN PATENT DOCUMENTS

WO      2015/172227 A1    11/2015
WO      2019/166688 A1    9/2019

OTHER PUBLICATIONS

Guede et al. "Geometry image coding improvements", ISO/IEC JTC1/SC29AWG11 M42111, Technicolor, Jan. 2018 (Year: 2018).*
(Continued)

*Primary Examiner* — Katrina R Fujita
(74) *Attorney, Agent, or Firm* — Harrington & Smith

(57) ABSTRACT

A method, apparatus and computer program product provide for encoding and decoding volumetric video data. In relation to encoding, one or more patches into which a point cloud representative of volumetric video data has been decomposed are evaluated by identifying one or more areas within a respective patch in which a difference in depth values between corresponding pixels of at least two depth planes satisfy a predefined threshold. For an area within the respective patch that has been identified, a sub patch is generated representative of the depth values of one of the depth planes. The patches are mapped including the one or more patches and the sub patch to a grid and an image is generated based upon the patches mapped to the grid.

12 Claims, 16 Drawing Sheets

(51) Int. Cl.
*H04N 19/137* (2014.01)
*H04N 19/176* (2014.01)
*H04N 19/597* (2014.01)

(56) References Cited

U.S. PATENT DOCUMENTS

| | | | |
|---|---|---|---|
| 2019/0087979 A1* | 3/2019 | Mammou | H04N 19/597 |
| 2019/0311500 A1* | 10/2019 | Mammou | G06T 9/001 |
| 2020/0107033 A1* | 4/2020 | Joshi | H04N 19/44 |
| 2023/0062296 A1* | 3/2023 | Ricard | G06T 9/001 |

OTHER PUBLICATIONS

Mammou, "PCC Test Model Category 2 v0", ISO/IEC JTC1/SC29/WG11, N17248, Oct. 2017, 11 pages.

Mammou, "First Working Draft for PCC Category 2", ISO/IEC JTC1/SC29/WG11, MPEG 2012/N17374, Jan. 2018, 5 pages.

Guede et al., "Geometry Image Coding Improvements", ISO/IEC JTC1/SC29/WG11 MPEG2016/ M42111, Jan. 2018, 15 pages.

International Search Report and Written Opinion received for corresponding Patent Cooperation Treaty Application No. PCT/FI2019/050352, dated Nov. 11, 2019, 14 pages.

Jantet, "Layered Depth Images for Multi-View Coding" Thesis, 2012, 137 pages.

Extended European Search Report received for corresponding European Patent Application No. 19799173.0, dated Feb. 25, 2022, 9 pages.

Schwarz et al., "Removal of second layer coding for PCC TMC2", ISO/IEC JTC1/SC29/WG11 MPEG2016/M42438, Feb. 2016, 7 Pages.

* cited by examiner

METHOD AND APPARATUS FOR ENCODING AND DECODING VOLUMETRIC VIDEO DATA

RELATED APPLICATION

This application claims priority to PCT Application No. PCT/FI2019/050352, filed on May 7, 2019, which claims priority to U.S. Provisional Application No. 62/668,901, filed on May 9, 2018, each of which is incorporated herein by reference in its entirety.

TECHNOLOGICAL FIELD

An example embodiment relates generally to encoding and decoding and, more particularly, to encoding and decoding volumetric video data.

BACKGROUND

Increasing computational resources and advances in three dimensional (3D) data acquisition devices has enabled reconstruction of detailed volumetric video representations of natural scenes. Infrared devices, lasers, time-of-flight devices and structured light devices are all examples of data acquisition devices that can be used to capture 3D video data. Representation of the 3D data depends on the manner in which the 3D data is to be used. Dense voxel arrays have been used to represent volumetric medical data. In applications utilizing 3D graphics, polygonal meshes are used. For applications in which real world 3D scenes have been captured but the the topology is not necessarily a two dimensional (2D) manifold, point clouds may be utilized to represent the 3D data. Another way to represent 3D data is coding this 3D data as a set of texture and depth maps as is the case in the multi-view plus depth. Related to the techniques used in multi-view plus depth is the use of elevation maps, and multi-level surface maps.

In dense point clouds or voxel arrays, the reconstructed 3D scene may contain tens or even hundreds of millions of points. If such representations are to be stored or interchanged between entities, then the data points must be compressed. Standard volumetric video representation formats, such as point clouds, meshes and voxels, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxels. Therefore, compression of dynamic 3D scenes is inefficient. 2D-video based approaches for compressing volumetric data, e.g., multiview and depth, have much better compression efficiency, but rarely cover the full scene. Therefore, they provide only limited six degree of freedom (6DOF) capabilities.

Alternatively, a 3D scene, represented as meshes, points, and/or voxels, can be projected onto one, or more, geometries. These geometries are "unfolded" onto 2D planes with two planes per geometry, one plane for texture and one plane for depth. The 2D planes are then encoded using standard 2D video compression technologies. Relevant projection geometry information is transmitted along with the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with efficient temporal compression. Thus, coding efficiency is increased. Using geometry-projections instead of prior 2D-video based approaches, e.g. multiview and depth, provide a better coverage of the scene or object. Thus, 6DOF capabilities are improved. Using several geometries for individual objects further improves the coverage of the scene. Furthermore, standard video encoding hardware can be utilized for real-time compression/decompression of the projected planes.

As shown in FIG. 1, volumetric video compression typically generates patches by decomposing the point cloud data into a plurality of patches. The patches are mapped to 2D grid and, in some instances, an occupancy map is generated from depth values (occupied pixels are pixels which have valid depth values). Geometry images and textures images may then be generated for subsequent storage and/or transmission. Referring to FIG. 2, the compressed images may thereafter be decompressed and the geometry and texture may be reconstructed, such that the image may then be viewed.

In projection-based volumetric video compression, a 3D surface is projected onto a 2D grid. The 2D grid has a finite resolution. Thus, as shown in FIG. 3, two or more points of the 3D surface may be projected on the same 2D pixel location. The image generation process exploits the 3D to 2D mapping to store the geometry and texture of the point cloud as images. In order to address multiple points being projected to the same pixel, each patch is projected onto two images, referred to as layers. More precisely, in an instance in which H(u,v) is the set of points of the current patch that are projected to the same pixel (u, v), the first layer, also called the near layer, the min layer or depthImg0, stores the points of H(u,v) with the lowest depth D0. The second layer, referred to as the far layer, the max layer or depthImg1, captures the points of H(u,v) with the highest depth within the interval [D0, D0+$\Delta$], where $\Delta$ is a user-defined parameter that describes the surface thickness. In some instances, the first geometry layer is encoded as it is and the second geometry layer is encoded as a delta to the first layer. Texture frames may be generated similarly, but both texture layer 1 and layer 2 may be encoded as separated texture frames In order to address the multiple projection planes created due to the projection of points to different depths during the 2D mapping, MPEG N17248 generates two projection layers per temporal instance, such as two geometry images, depthImg0 and depthImg1, per input point cloud. Both images share the same occupancy map. The only difference is the value stored at each occupied position, that is, pixel p0 at point (u, v) of depthImg0 stores D0, and pixel p1 at the same point (u, v) from depthImg1 stores the difference between D0 and D1. D0 and D1 correspond to two 3D points that differ, at most, by the surface thickness.

FIGS. 4 and 5 show examples of depthImg0 and depthImg1 images, respectively. In these depth images, for two 3D points, P0 and P1, projected to coordinates (u, v) generating D0 and D1, respectively, the value of pixel p0 at coordinates (u, v) in depthImg0 is proportional to the value of the projected component of P0, whereas the value of pixel p1 at coordinates (u,v) from depthImg1 is the difference between the projected component of P1 and P0. DepthImg1 image essentially contains contour-like, high frequency features and, as such, it is difficult for DepthImg1 to be accurately encoded using traditional video codecs. As shown in FIG. 6, the high frequency features are generally lost in the decoded depthImg1 image.

In an effort to retain the high frequency features, one approach involves absolute coding of the D1 with reconstruction correction. In this approach, the value of the geometry information projected onto depthImg1 is not encoded as a delta between D1 and D0. Instead, the projected information is encoded as an absolute depth value. As such, depthImg1 has the same characteristics as depthImg0, therefore becoming more suitable to being accurately compressed.

Another approach to retain the high frequency features involves geometry-based point interpolation. In this approach, compression efficiency of geometry images is improved by replacing some of the geometry information explicitly encoded using geometry images by a point interpolation algorithm.

In this approach, the encoding of the depthImg1 image is eliminated and point interpolation is added to the geometry reconstruction that, from the reconstructed geometry (obtained from the depthImg0), creates new points. The new points are then used to form an implicit depthImg1 image to build the texture image. The proceeds then proceeds in a conventional manner with two texture images being generated to encode the color information of the points, regardless of how the geometry has been obtained, that is, regardless of whether the geometry was obtained from the depthImg0 image or from the interpolation.

This approach requires modifications both to the encoder and the decoder. With respect to the encoder, the depthImg1 image is removed. Thus, a single depthImg0 is encoded resulting in less information being compressed. In addition, geometry reconstruction, that is, point interpolation, is added assist with texture compression. During texture compression, geometry interpolation is used to generate missing points, that is, points not captured by the depth1 patch, and improve the point cloud geometry reconstruction. This process a texture1 image to be created that contains colors of a mix of deprojected points (depthImg0) and points generated by the geometry interpolation. No additional geometry information is encoded as the same process can be repeated by the decoder. With respect to the decoder, the same geometry-based point interpolation algorithm must be used as the algorithm employed by the encoder in order to avoid decoding drift. Also, for texture reconstruction, the color of the interpolated points is directly decoded from the texture images or approximated from decoded points. Thus, both geometry reconstruction and texture reconstruction must be added.

However, even when geometry-based point interpolation is employed, the remaining textureImage1 provides little updated data and can be compressed efficiently in terms of bitrate, but still requires buffer memory at the encoder and decoder. Furthermore, a decoder has to be able to decode at twice the framerate as the actual playback rate in order to decode textureImage0 and textureImage1 to reconstruct a single point cloud frame. Also, TextureImage1 requires geometry reconstruction and smoothing at the encoder, thus increasing encoding time and memory requirements. Further, point interpolation performed on the 3D data is complex and time consuming.

BRIEF SUMMARY

A method, apparatus and computer program product are provided in accordance with an example embodiment to encode and decode volumetric video data. In relation to encoding volumetric video data including three-dimensional surfaces that have been projected onto a two-dimensional grid so as to create multiple depth planes having positionally corresponding pixels representative of different depth values, a single image is generated based upon patches from one of the projecton planes. To preserve information from the other depth planes, however, sub patches are generated for any areas of a patch for which the depth values of the multiple depth planes differ appreciably. By encoding not only the patches but also the sub patches into the single image, the volumetric video data is efficiently encoded. A corresponding decoding technique is also provided.

In one example embodiment, a method is provided that includes evaluating one or more patches into which a point cloud representative of volumetric video data has been decomposed. The evaluation of the one or more patches includes identifying one or more areas within a respective patch in which a difference in depth values between corresponding pixels of at least two depth planes satisfy a predefined threshold. For an area within the respective patch that has been identified, the method includes generating a sub patch representative of the depth values of one of the depth planes. The method also includes mapping the patches including the one or more patches and the sub patch to a grid and generating an image based upon the patches mapped to the grid.

In an embodiment in which the grid is formed of a plurality of blocks, the evaluation of one or more patches includes separately evaluating one or more of the blocks of the respective patch to identify one or more areas within the respective patch corresponding to the respective blocks in which the difference in depth values between corresponding pixels of at least two depth planes satisfy the predefined threshold. In an alternative embodiment, the identification of one or more areas within the respective patch includes identifying one or more pixels within the respective patch for which the difference in the depth values of the at least two depth planes satisfies the predefined threshold and filling one or more holes between the one or more pixels that were identified to create the one or more areas within the respective patch. The method of this example embodiment may also include filtering the one or more pixels that were identified to eliminate single pixels that are not surrounded by other pixels prior to filling one or more holes and/or thresholding the one or more pixels after filling one or more holes such that the pixels have one of only two values.

A method of an example embodiment also includes associating metadata with the sub patch including parent patch information that identifies the respective patch from which the sub patch was generated and/or sub patch location information that identifies a location of the sub patch in relation to the respective patch from which the sub patch was generated. In an example embodiment, the method also includes associating metadata with the respective patch including children information that identifies one or more sub patches that are generated from the respective patch.

In another example embodiment, an apparatus is provided that includes at least one processor and at least one memory including computer program code for one or more programs with the at least one memory and the computer program code configured to, with the at least one processor, cause the apparatus at least to evaluate one or more patches into which a point cloud representative of volumetric video data has been decomposed by identifying one or more areas within a respective patch in which a difference in depth values between corresponding pixels of at least two depth planes satisfy a predefined threshold. For an area within the respective patch that has been identified, the at least one memory and the computer program code are configured to, with the at least one processor, cause the apparatus to generate a sub patch representative of the depth values of one of the depth planes. The at least one memory and the computer program code are also configured to, with the at least one processor, cause the apparatus to map the patches including the one or more patches and the sub patch to a grid and to generate an image based upon the patches mapped to the grid.

In an embodiment in which the grid is formed of a plurality of blocks, the at least one memory and the computer program code are configured to, with the at least one processor, cause the apparatus to evaluate one or more patches by separately evaluating one or more of the blocks of the respective patch to identify one or more areas within the respective patch corresponding to the respective blocks in which the difference in depth values between corresponding pixels of at least two depth planes satisfy the predefined threshold. In an alternative embodiment, the at least one memory and the computer program code are configured to, with the at least one processor, cause the apparatus to identify one or more areas within the respective patch by identifying one or more pixels within the respective patch for which the difference in the depth values of the at least two depth planes satisfies the predefined threshold and filling one or more holes between the one or more pixels that were identified to create the one or more areas within the respective patch. In this example embodiment, the at least one memory and the computer program code may be further configured to, with the at least one processor, cause the apparatus to identify one or more areas within the respective patch by filtering the one or more pixels that were identified to eliminate single pixels that are not surrounded by other pixels prior to filling one or more holes and/or to threshold the one or more pixels after filling one or more holes such that the pixels have one of only two values.

The at least one memory and the computer program code are further configured to, with the at least one processor, cause the apparatus of an example embodiment to associate metadata with the sub patch including parent patch information that identifies the respective patch from which the sub patch was generated and/or sub patch location information that identifies a location of the sub patch in relation to the respective patch from which the sub patch was generated. The at least one memory and the computer program code are further configured to, with the at least one processor, cause the apparatus of another example embodiment to associate metadata with the respective patch including children information that identifies one or more sub patches that are generated from the respective patch.

In a further example embodiment, a computer program product is provided that includes at least one non-transitory computer-readable storage medium having computer executable program code instructions stored therein with the computer executable program code instructions including program code instructions configured, upon execution, to evaluate one or more patches into which a point cloud representative of volumetric video data has been decomposed by identifying one or more areas within a respective patch in which a difference in depth values between corresponding pixels of at least two depth planes satisfy a predefined threshold. For an area within the respective patch that has been identified, the computer executable program code instructions also include program code instructions configured, upon execution, to generate a sub patch representative of the depth values of one of the depth planes. The computer executable program code instructions also include program code instructions configured, upon execution, to map the patches including the one or more patches and the sub patch to a grid and to generate an image based upon the patches mapped to the grid.

In an embodiment in which the grid is comprised of a plurality of blocks, the program code instructions configured to evaluate one or more patches include program code instructions configured to separately evaluate one or more of the blocks of the respective patch to identify one or more areas within the respective patch corresponding to the respective blocks in which the difference in depth values between corresponding pixels of at least two depth planes satisfy the predefined threshold. In an alternative embodiment, the program code instructions configured to identify one or more areas within the respective patch include program code instructions configured to identify one or more pixels within the respective patch for which the difference in the depth values of the at least two depth planes satisfies the predefined threshold and program code instructions configured to fill one or more holes between the one or more pixels that were identified to create the one or more areas within the respective patch. In this example embodiment, the program code instructions configured to identify one or more areas within the respective patch may also include program code instructions configured, upon execution, to filter the one or more pixels that were identified to eliminate single pixels that are not surrounded by other pixels prior to filling one or more holes and/or program code instructions configured, upon execution, to threshold the one or more pixels after filling one or more holes such that the pixels have one of only two values.

The computer executable program code instructions of an example embodiment further include program code instructions configured, upon execution, to associate metadata with the sub patch including parent patch information that identifies the respective patch from which the sub patch was generated and/or sub patch location information that identifies a location of the sub patch in relation to the respective patch from which the sub patch was generated. In an example embodiment, the computer executable program code instructions further include program code instructions configured, upon execution, to associate metadata with the respective patch including children information that identifies one or more sub patches that are generated from the respective patch.

In a further example embodiment, an apparatus is provided that includes means for evaluating one or more patches into which a point cloud representative of volumetric video data has been decomposed. The means for evaluating the one or more patches includes means for identifying one or more areas within a respective patch in which a difference in depth values between corresponding pixels of at least two depth planes satisfy a predefined threshold. For an area within the respective patch that has been identified, the apparatus includes means for generating a sub patch representative of the depth values of one of the depth planes. The apparatus also includes means for mapping the patches including the one or more patches and the sub patch to a grid and means for generating an image based upon the patches mapped to the grid.

In an embodiment in which the grid is formed of a plurality of blocks, the means for evaluating one or more patches includes means for separately evaluating one or more of the blocks of the respective patch to identify one or more areas within the respective patch corresponding to the respective blocks in which the difference in depth values between corresponding pixels of at least two depth planes satisfy the predefined threshold. In an alternative embodiment, the means for identifying one or more areas within the respective patch includes means for identifying one or more pixels within the respective patch for which the difference in the depth values of the at least two depth planes satisfies the predefined threshold and means for filling one or more holes between the one or more pixels that were identified to create the one or more areas within the respective patch. The apparatus of this example embodiment may also include means for filtering the one or more pixels that were identified to eliminate single pixels that are not surrounded by other pixels prior to filling one or more holes and/or means for thresholding the one or more pixels after filling one or more holes such that the pixels have one of only two values.

An apparatus of an example embodiment also includes means for associating metadata with the sub patch including parent patch information that identifies the respective patch from which the sub patch was generated and/or sub patch location information that identifies a location of the sub patch in relation to the respective patch from which the sub patch was generated. In an example embodiment, the apparatus also includes means for associating metadata with the respective patch including children information that identifies one or more sub patches that are generated from the respective patch.

In an example embodiment, a method is provided that includes decoding one or more patches that fail to include parent patch information identifying a respective patch from which the one or more patches were generated. For each of a plurality of pixels of a sub patch that includes parent patch information and sub patch location information that identifies a location of the sub patch in relation to the respective patch from which the sub patch was generated, the method includes comparing depth values of the pixel of the sub patch and a corresponding pixel of the patch from which the sub patch was generated to determine a difference therebetween. In an instance in which the difference satisfies a predefined threshold indicative of a variation therebetween, the method includes decoding the pixel of the sub patch, while in an instance in which the difference fails to satisfy the predefined threshold, the method includes discarding the pixel of the sub patch without decoding.

In another example embodiment, an apparatus is provided that includes at least one processor and at least one memory including computer program code for one or more programs with the at least one memory and the computer program code configured to, with the at least one processor, cause the apparatus at least to decode one or more patches that fail to include parent patch information identifying a respective patch from which the one or more patches were generated. For each of a plurality of pixels of a sub patch that includes parent patch information and sub patch location information that identifies a location of the sub patch in relation to the respective patch from which the sub patch was generated, the at least one memory and the computer program code are also configured to, with the at least one processor, cause the apparatus to compare depth values of the pixel of the sub patch and a corresponding pixel of the patch from which the sub patch was generated to determine a difference therebetween. In an instance in which the difference satisfies a predefined threshold indicative of a variation therebetween, the at least one memory and the computer program code are also configured to, with the at least one processor, cause the apparatus to decode the pixel of the sub patch, while in an instance in which the difference fails to satisfy the predefined threshold, the at least one memory and the computer program code are also configured to, with the at least one processor, cause the apparatus to discard the pixel of the sub patch without decoding.

In a further example embodiment, a computer program product is provided that includes at least one non-transitory computer-readable storage medium having computer executable program code instructions stored therein with the computer executable program code instructions including program code instructions configured, upon execution, to decode one or more patches that fail to include parent patch information identifying a respective patch from which the one or more patches were generated. For each of a plurality of pixels of a sub patch that includes parent patch information and sub patch location information that identifies a location of the sub patch in relation to the respective patch from which the sub patch was generated, the computer executable program code instructions also include program code instructions configured, upon execution, to compare depth values of the pixel of the sub patch and a corresponding pixel of the patch from which the sub patch was generated to determine a difference therebetween. In an instance in which the difference satisfies a predefined threshold indicative of a variation therebetween, the computer executable program code instructions also include program code instructions configured, upon execution, to decode the pixel of the sub patch, while in an instance in which the difference fails to satisfy the predefined threshold, the computer executable program code instructions also include program code instructions configured, upon execution, to discard the pixel of the sub patch without decoding.

In yet another example embodiment, an apparatus is provided that includes means for decoding one or more patches that fail to include parent patch information by identifying a respective patch from which the one or more patches were generated. For each of a plurality of pixels of a sub patch that includes parent patch information and sub patch location information that identifies a location of the sub patch in relation to the respective patch from which the sub patch was generated, the apparatus also includes means for comparing depth values of the pixel of the sub patch and a corresponding pixel of the patch from which the sub patch was generated to determine a difference therebetween. In an instance in which the difference satisfies a predefined threshold indicative of a variation therebetween, the apparatus also includes means for decoding the pixel of the sub patch, while in an instance in which the difference fails to satisfy the predefined threshold, the apparatus also includes means for discarding the pixel of the sub patch without decoding.

BRIEF DESCRIPTION OF THE DRAWINGS

Figure 1:
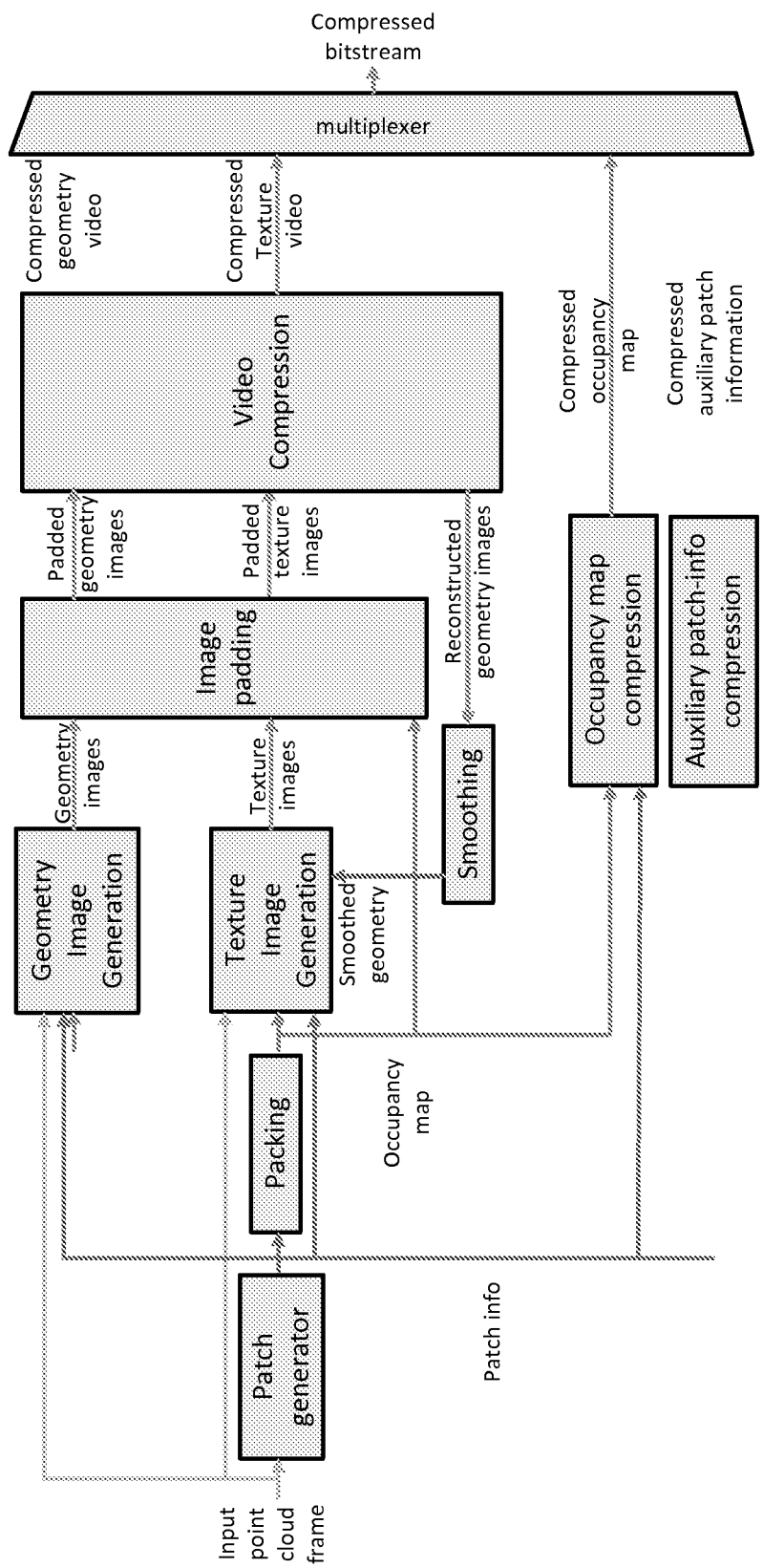
Figure 2:
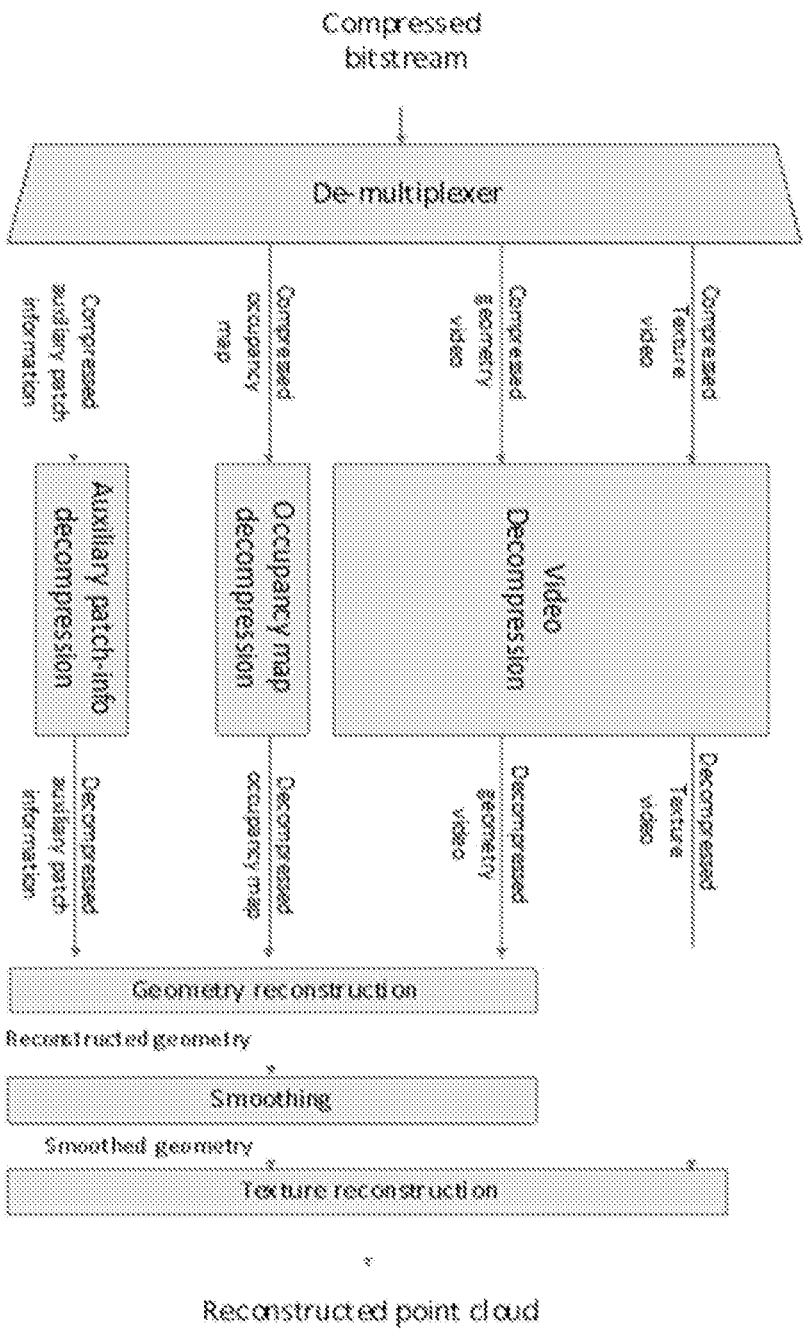
Figure 3:
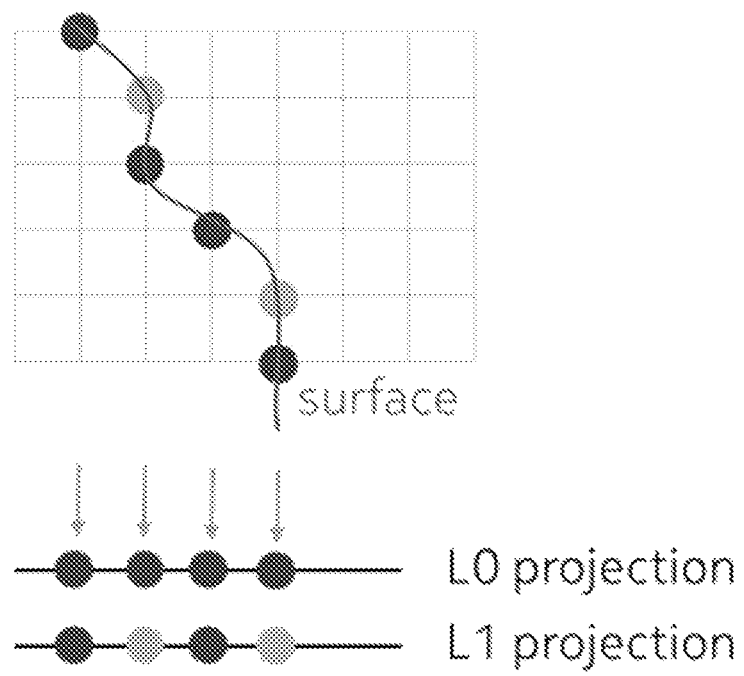
Figure 4:
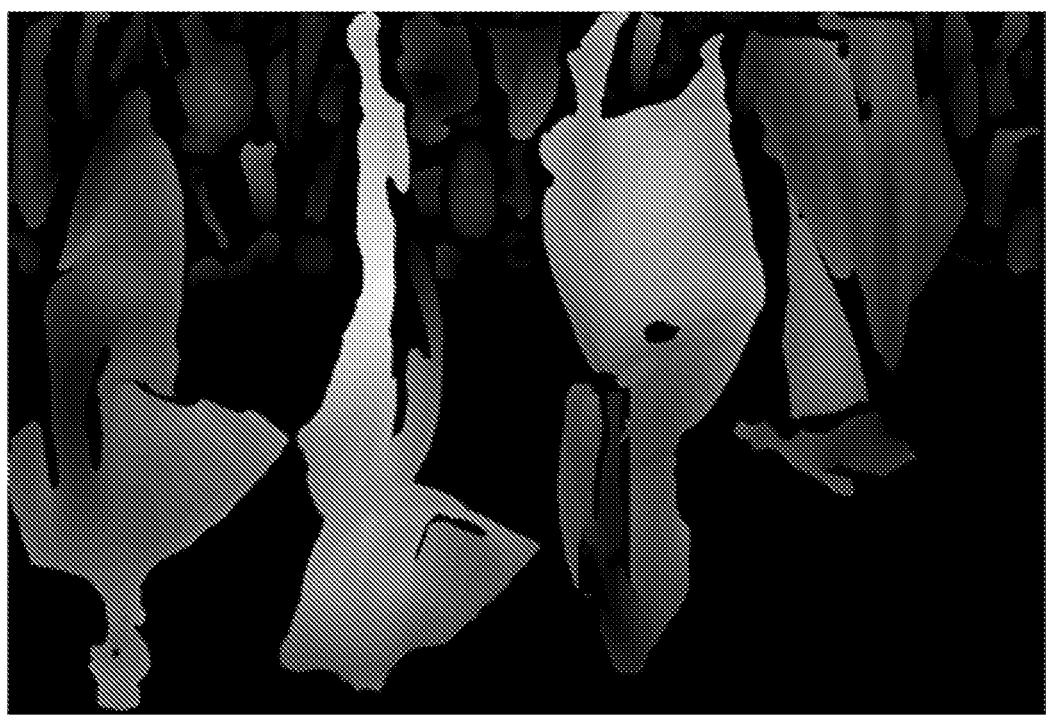
Figure 5:
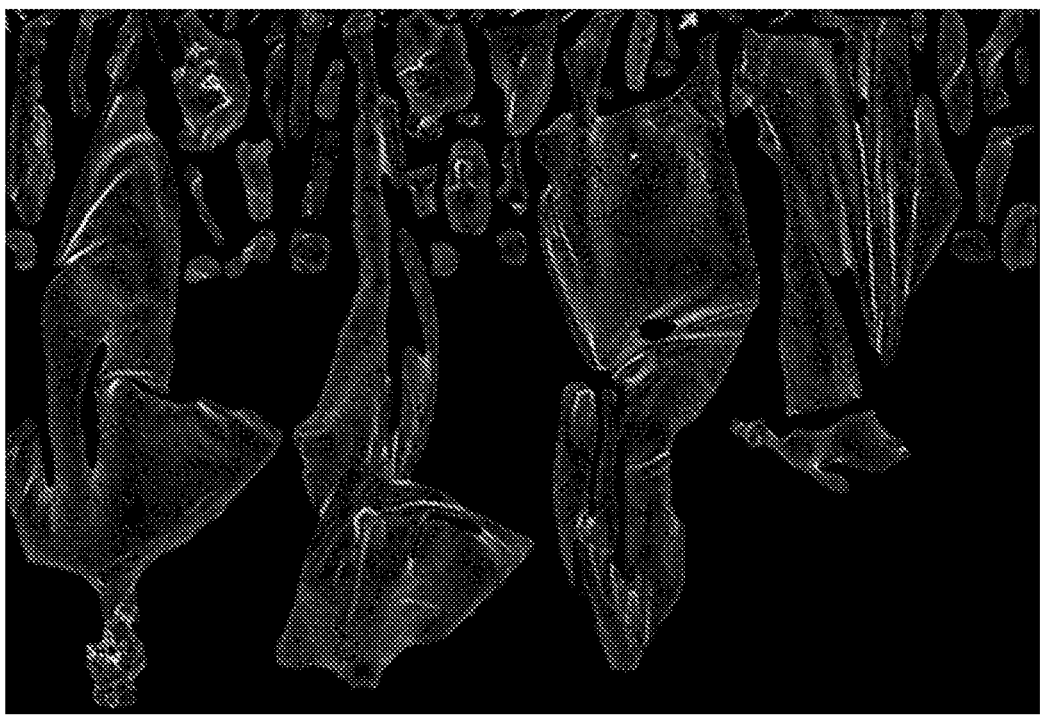
Figure 6:
Figure 7:
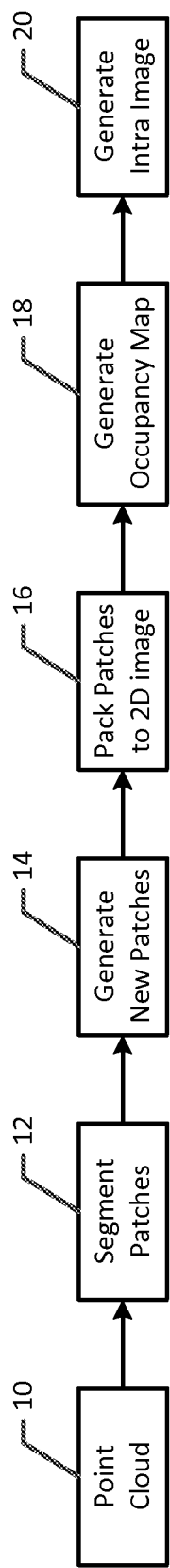
Figure 8:
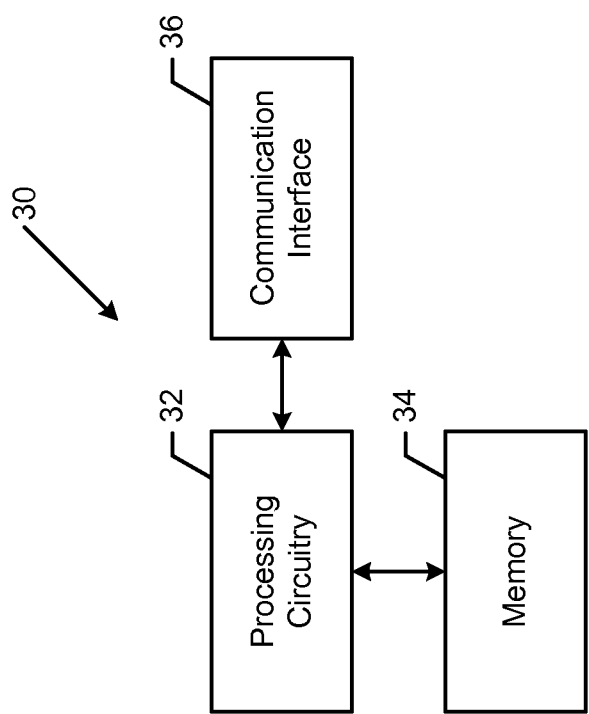
Figure 9:
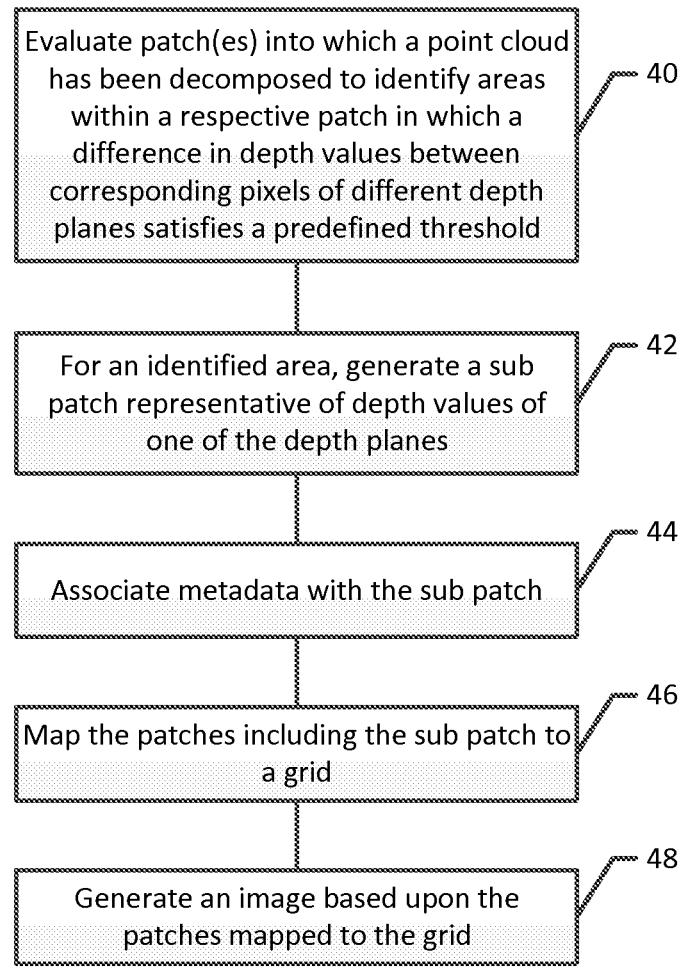
Figure 10:
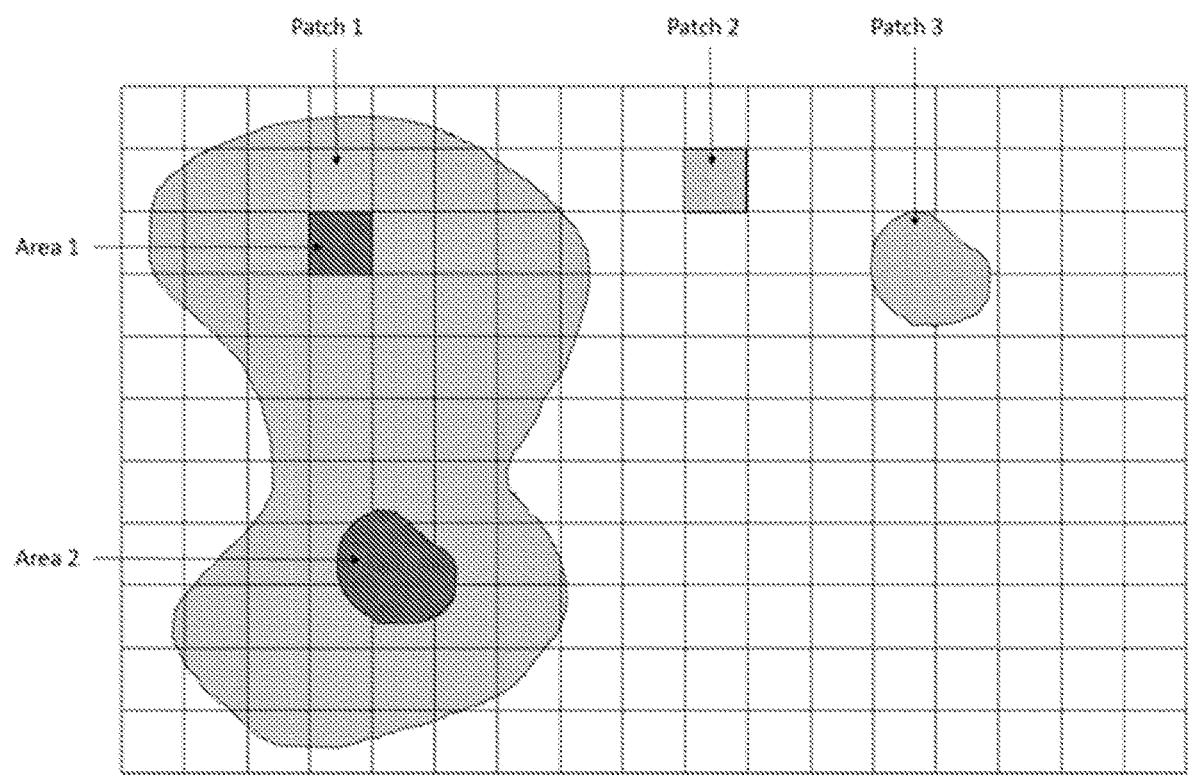
Figure 11:
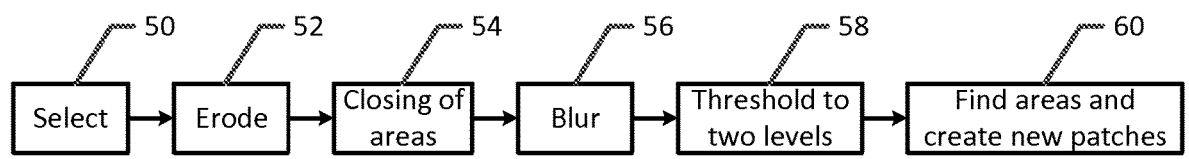
Figure 12:
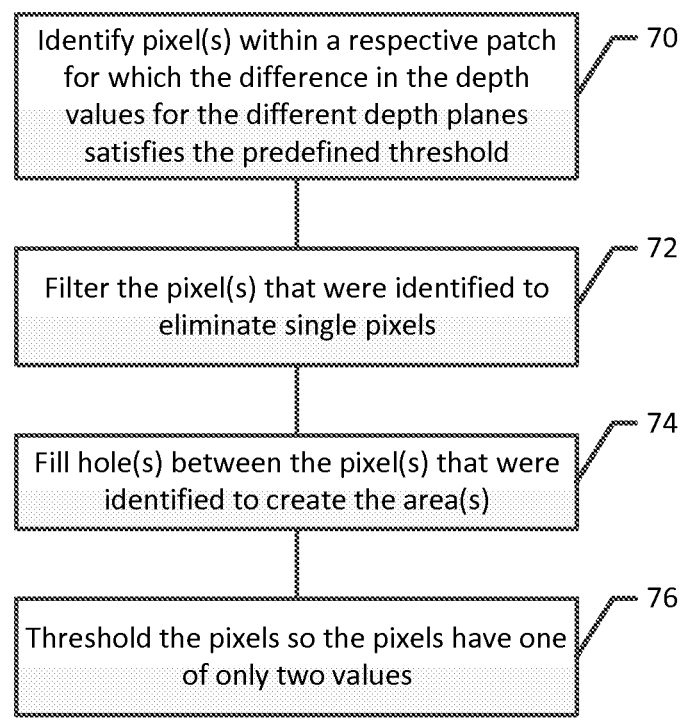
Figure 13:
Figure 14:
Figure 15:
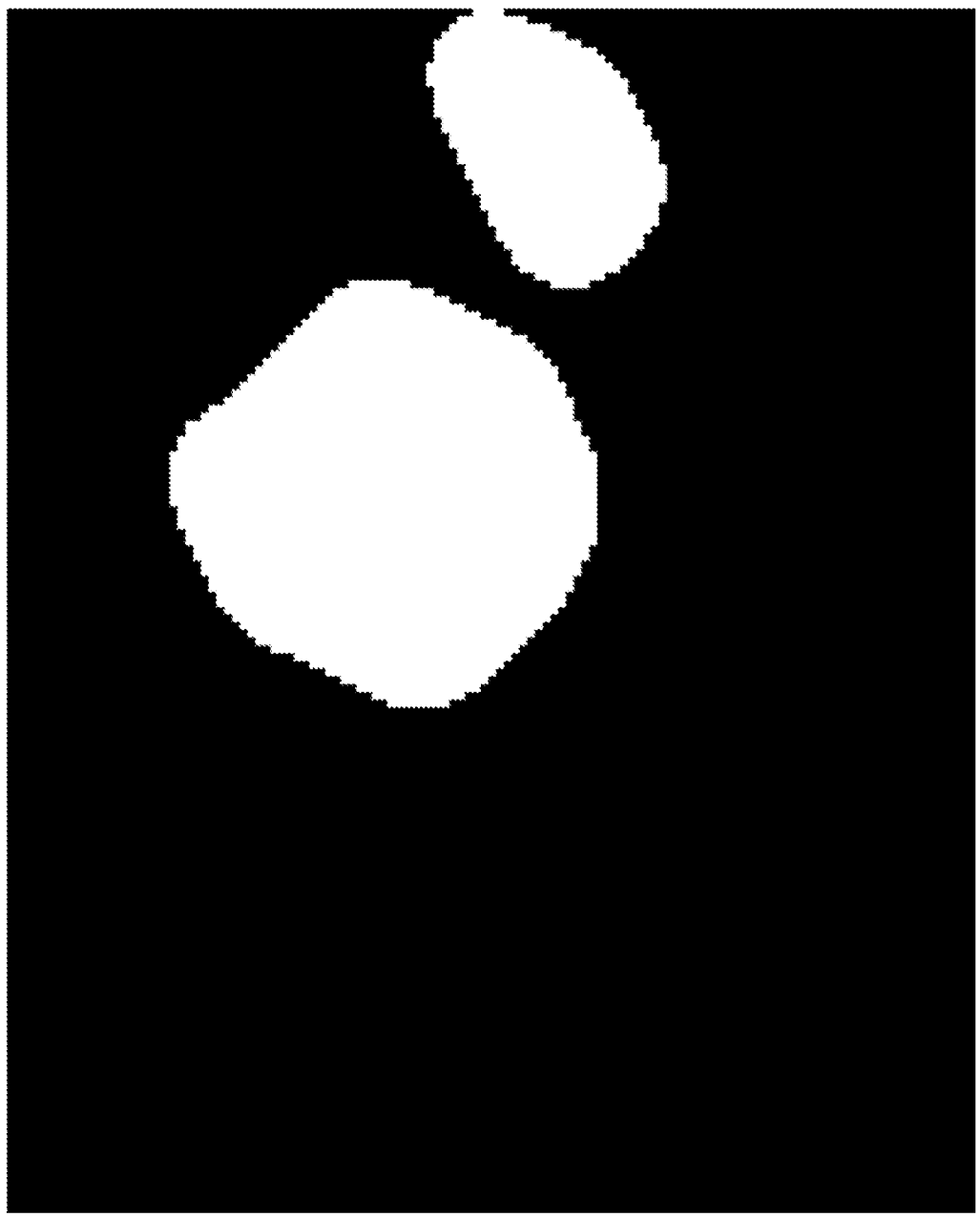
Figure 16:
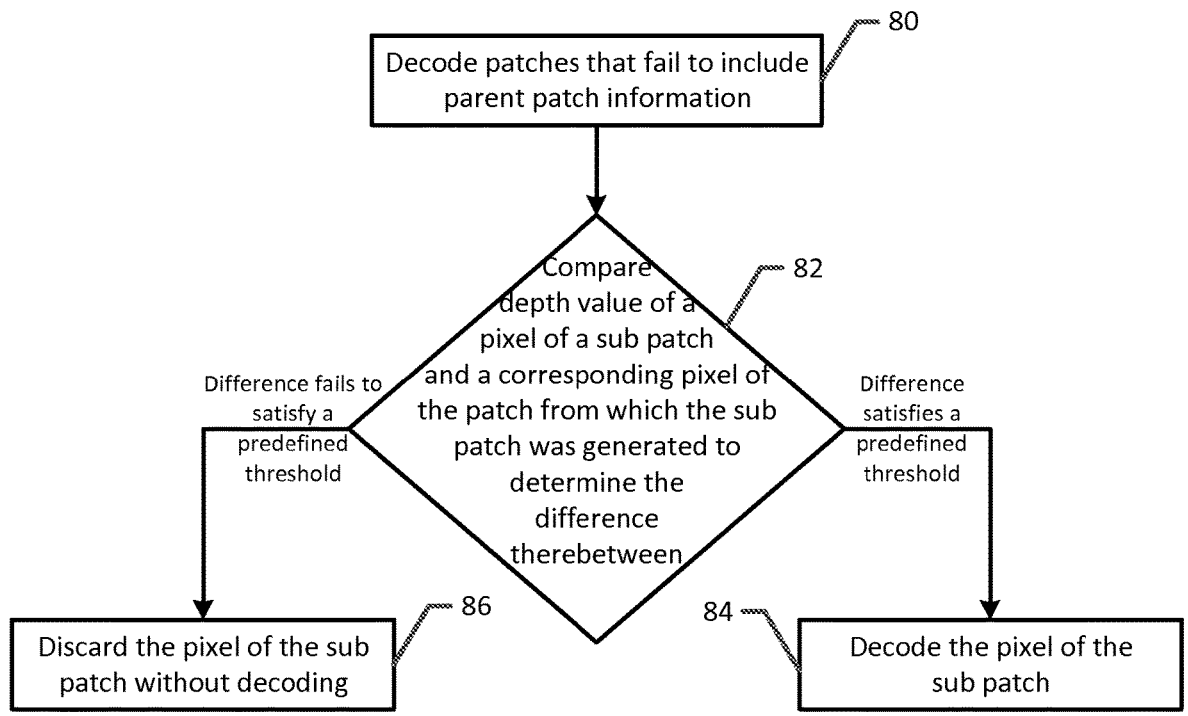

Having thus described embodiments of the invention in general terms, reference will now be made to the accompanying drawings, which are not necessarily drawn to scale, and wherein:

FIG. 1 is a block diagram of a compression process of TMC2v0 of Moving Picture Experts Group (MPEG) N17248;

FIG. 2 is a block diagram of a decompression process of TMC2v0 of MPEG N17248;

FIG. 3 illustrates the projection of multiple points from a point cloud onto a two dimensional (2D) grid and, more particularly, onto different depth planes representative of pixels having different depth values;

FIG. 4 is an image to be coded that is representative of a depth plane at a first depth;

FIG. 5 is an image to be coded that is representative of a depth plane at a second depth, different than the first depth;

FIG. 6 is the image of FIG. 5 following encoding;

FIG. 7 is a flow chart illustrating operations performed in order to encode volumetric video data in accordance with an example embodiment of the present disclosure;

FIG. 8 is a block diagram of an apparatus that may be specifically configured in accordance with an example embodiment of the present disclosure;

FIG. 9 is a flow chart illustrating operations performed, such as by the apparatus of FIG. 8, in order to encode volumetric video data in accordance with an example embodiment of the present disclosure;

FIG. 10 is a graphical representation of a patch and two areas that are identified for which a difference in depth values between corresponding pixels of at least two depth planes satisfy a predefined threshold and for which sub patches are generated in accordance with an example embodiment of the present disclosure;

FIG. 11 is a flow chart illustrating operations performed, such as by the apparatus of FIG. 8, in accordance with a contour-based patch generation process of an example embodiment of the present disclosure;

FIG. 12 is is another flow chart illustrating operations performed, such as by the apparatus of FIG. 8, in accordance with a contour-based patch generation process of an example embodiment of the present disclosure;

FIG. 13 is an image in which the brightness of the pixels corresponds to the difference in corresponding depth values of first and second depth planes in accordance with an example embodiment of the present disclosure;

FIG. 14 depicts the image of FIG. 13 once the pixels that fail to satisfy the predefined threshold have been eliminated in accordance with an example embodiment of the present disclosure;

FIG. 15 depicts the image of FIG. 14 once the areas have been filled in accordance with an example embodiment of the present disclosure; and FIG. 16 is a flow chart illustrating operations performed, such as by the apparatus of FIG. 8, in order to decode an image file that includes sub patches in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to encode and/or decode volumetric video data. Volumetric video data represents a three-dimensional (3D) scene or object and may be utilized in conjunction with a variety of applications including, for example, augmented reality (AR), virtual reality (VR) and mixed reality (MR) applications. Volumetric video data describes geometry, that is, shape, size and position in a 3D space, and respective attributes of the geometrical features, e.g., color, opacity, reflectance, etc. Volumetric video data may also represent temporal changes to the geometry and/or attributes at one or more given time instances. Volumetric video may be generated from 3D models, such as computer generated images (CGI), or may be captured from real-world scenes using a variety of capture techniques, such as, a multi-camera system, a laser scan, a combination of video and dedicated depth sensors, etc. Volumetric video may also be generated by a combination of CGI and real-world scenes that are captured. Representation formats for volumetric video data include triangle meshes, point clouds, or voxels. Temporal information regarding a scene may be included in the form of individual capture instances, similar to frames in a two-dimensional (2D) video, or by other techniques, such as the position of an object as a function of time. Because volumetric video describes a 3D scene or object, volumetric video data can be viewed from any viewpoint. Thus, volumetric video may be useful in order to provide multiple degree of freedom (DOF) viewing capabilities, such as 6DOF.

With respect to the encoding of volumetric video data by a method, apparatus and computer program product of an example embodiment, FIG. 7 illustrates a flowchart of the operations performed, such as by an apparatus of an example embodiment. The apparatus may be embodied by any of a wide variety of devices including, for example, a video codec. A video codec includes an encoder that transforms input video into a compressed representation suited for storage and/or transmission and a decoder that can decompress the compressed video representation so as to result in a viewable form of a video. Typically, the encoder discards some information from the original video sequence so as to represent the video in a more compact form, such as at a lower bit rate. As an alternative to a video codec, the apparatus may, instead, be embodied by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by an image capture system configured to capture the images that comprise the volumetric video data.

Regardless of the video codec or other type of computing device that embodies the apparatus, the apparatus 30 of an example embodiment is depicted in FIG. 8 and includes, is associated with or is otherwise in communication with processing circuitry 32, a memory 34 and a communication interface 36. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 30 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring again to FIG. 7, the operations performed, such as by the apparatus 30 of FIG. 8, in order to compress volumetric video data are depicted. As shown in block 10 of FIG. 7, the apparatus includes a means, such as the processing circuitry 32, the communication interface 36, the memory 34 or the like for receiving volumetric video data, such as a point representing one or more 3D surfaces. The volumetric video data, such as the point cloud data, is segmented and projected into patches as shown in block 12 of FIG. 7. In this regard, the apparatus of an example embodiment includes means, such as a processing circuitry or the like, for segmenting the volumetric video data and projecting the volumetric video data into patches.

In relation to the segmentation of the volumetric video data, such as the point cloud data, into a plurality of patches, the apparatus 30, such as the processing circuitry 32, of an example embodiment is configured to decompose the volumetric video data into a plurality of patches, such as a minimum number of patches, having smooth boundaries while also taking into account, such as minimizing, the reconstruction error. In an example embodiment, the patches are generated by initially estimating the normal at every point in the 3D space. The points of the volumetric video data are then initially clustered by associating each point with one of the following six oriented planes, as defined by their respective normals:

(1.0, 0.0, 0.0)
(0.0, 1.0, 0.0)
(0.0, 0.0, 1.0)
(−1.0, 0.0, 0.0)
(0.0, −1.0, 0.0)
(0.0, 0.0, −1.0)

As a result, each point has volumetric video data that is associated with the plane that has the closest normal, thereby maximizing the dot product of the normal for the point from the volumetric video data and the normal to the plane. The apparatus 30, such as the processing circuitry 32, of an example embodiment then refines the initial clustering by iteratively updating the cluster index associated with each point based on its normal in the cluster indices of its nearest neighbors. The apparatus, such as a processing circuitry, then extracts patches by applying a connected component extraction procedure. As such, a patch is created from the points that have similar normal and, in some embodiments, a patch is created so as to be as large as possible so long as the normals to the points extend in a similar direction such that the points that comprise the patch project to the same depth plane, e.g., the same x/y/z depth plane.

As described above in relation to FIG. 3, in projection-based volumetric video compression, a 3D surface represented by the volumetric video data is projected onto a 2D grid. As a result of the finite resolution of the 2D grid, two or more points of the 3D surface may be projected to the same 2D pixel location. As such, two depth layers may be generated per temporal instance in order to capture each of the points of the 3D surface that are projected onto the same pixel of the 2D grid. Each of the two projections are at a different depth, thereby separately representing the different points of the 3D surface that are projected onto the same point of the 2D grid. Consequently, the projection of the volumetric video data onto a 2D grid results in the generation of a plurality, such as two, depth layers, each providing a different depth image representation. For example, a first depth layer, such as a near or min layer, e.g., depthImg0 as shown in FIG. 4, that stores the points that have been projected with the minimum depth D0 and a second depth layer, such as a far or may layer, e.g., depthImg1 as shown in FIG. 5, that stores the points that have been projected with the greatest depth within the interval [D0, D0+Δ] where Δ is a user-defined parameter that describes the surface thickness, can be generated.

In order to efficiently represent the volumetric video data while preserving the depth information provided by the multiple projections of the volumetric video data from the 3D space to the 2D grid, the apparatus 30 of an example embodiment, such as the processing circuitry 32, generates sub patches for those areas for which the depth information provided by the projections varies appreciably so as to retain the useful depth information without creating sub patches or otherwise retaining information regarding other areas in which the differences in the depth of the projections is negligible. The patches and the sub patches may then be encoded in a single image so as to avoid the generation of multiple images to represent the different depth layers.

In an example embodiment depicted in more detail in FIG. 9, the apparatus 30 includes means, such as the processing circuitry 32 or the like, for evaluating each patch into which a point cloud representative of volumetric video data has been decomposed. See block 40. In this regard, the apparatus, such as the processing circuitry, is configured to evaluate the patch so as to identify any areas within the respective patch for which the difference in depth values between corresponding pixels of the multiple depth planes satisfy a predefined threshold, such as by exceeding a predefined threshold. For an area within the respective patch that has been identified as having a difference in depth values between corresponding pixels of the depth planes that satisfies a predefined threshold, the apparatus of this example embodiment includes means, such as the processing circuitry or the like, for generating a sub patch representative of the depth values of one of the depth planes. See block 14 of FIG. 7 and block 42 of FIG. 9. In this regard, in an instance in which the projection of the 3D volumetric video data onto a 2D grid results in the generation of first and second depth planes having pixels representative of different depth values, such as a first depth plane representative of the minimum depth at which points from the volumetric video data are projected onto a corresponding point on the 2D grid and a second depth plane representative of the maximum depth at which points of the volumetric video data are projected onto the same point of the 2D grid, the patches that have been generated may be based upon the points that have been projected onto one of the depth planes, such as the first depth plane. In this example, the sub patch that is generated (from an area within a respective patch) is representative of the depth values of the second depth plane, that is, the other depth plane relative to the first depth plane upon which the respective patch is generated. Conversely, if the respective patch has been generated based upon the second depth layer in the foregoing example, the sub patch would be generated based upon the first depth plane. Although the sub patches may be generated in various manners, the sub patches may be generated in the same manner as described above in conjunction with the generation of patches.

As shown in block 16 of FIG. 7 and block 46 of FIG. 9, the apparatus 30 also includes means, such the processing circuitry 32 or the like, for packing the patches onto a 2D grid. In this regard, the patches are packed by mapping the patches, including the one or more patches into which the volumetric video data has been decomposed and the sub patches that have been generated, to a grid, such as a 2D grid, while, in an example embodiment, minimizing the unused space and guaranteeing that every block, such as every 16 pixel×16 pixel block, of the 2D grid is associated with a unique patch. The size of the blocks may be defined by the user and encoded into the bit stream that provides the volumetric video data.

As shown in block 18 of FIG. 7, the apparatus 30 of an example embodiment also includes means, such as the processing circuitry 32 or the like, for generating an occupancy map. The occupancy map indicates which pixels of the resulting grid have valid depth values and, conversely, which pixels do not have valid depth values. Thereafter, the apparatus includes means, such as a processing circuitry or the like, for generating an image of the patch and sub patches so as to represent the volumetric video data, albeit in a compressed representation. See block 20 of FIG. 7 and block 48 of FIG. 9. By generating a single image that includes both the patches and sub patches, the single image may include the depth information from both depth layers, thereby allowing the volumetric video data to be more efficiently encoded while still capturing the depth information conveyed by the two different depth layers.

As volumetric video data generally includes both geometry and texture, the process described above in conjunction with FIGS. 7 and 9 may be performed separately for the geometry information provided by the volumetric video data and for the texture information provided by the volumetric video data, thereby resulting in one image representative of the geometry of the volumetric video data, another image representative of the texture of the volumetric video data and a third image of the occupancy map. In each instance, however, a single image is generated for the geometry and a single image is generated for the texture, while retaining the depth information provided by the two depth layers that are generated during the projection of the volumetric video data onto a 2D grid. The resulting image may then be padded, compressed, and multiplexed into a bit stream for transmission. Additionally or alternatively, the resulting image may be stored, such as in memory 34 or in another database in communication with the apparatus.

By way of example of the evaluation of a patch and the identification of one or more areas within the respective patch for which the difference in depth values between corresponding pixels of at least two depth planes satisfy the predefined threshold, FIG. 10 depicts a single patch within which two different areas have been identified for which the difference in depth values between corresponding pixels of the depth plane satisfy the predefined threshold. For each of these two areas, a sub patch is generated as shown in FIG. 3. The sub patches are added to the list of patches and then processed in the same fashion as the original patches in the subsequent operations including, for example, packing the patches to a 2D image.

Metadata may be associated with the patches and sub patches and, in an example embodiment, the metadata may provide information regarding the relationship between a patch and the one or more sub patches generated from areas within a respective patch. By including this metadata, the resulting image may thereafter be decoded in such a way that the decoding of the patches and sub patches proceeds as intended with the relationship between the sub patches and the corresponding patch defined by the metadata. Although various types of metadata may be associated with a patch or sub patch, the apparatus 30 of an example embodiment includes means, such as the processing circuitry 32 or the like, for associating metadata with the sub patch that includes parent patch information that identifies the respective patch from which the sub patch was generated. See block 44 of FIG. 9. In an example embodiment, the apparatus also includes means, such as the processing circuitry or the like, for associating metadata with the sub patch that includes sub patch location information that identifies the location of the sub patch in relation to the respective patch from which the sub patch was generated. Additionally or alternatively, the apparatus of an example embodiment includes means, such as the processing circuitry or the like, for associating metadata with the respective patch including children information that identifies the one or more sub patches that were generated from the respective patch.

The identification of one or more areas within a respective patch for which the difference in depth values between corresponding pixels of the different depth planes satisfies a predefined threshold may be performed in various manners. In an example embodiment in which the 2D grid is comprised of a plurality of blocks, the apparatus 30 of an example embodiment includes means, such as the processing circuitry 32 or the like, for evaluating a patch by separately evaluating each block of the respective patch to identify if the area of the patch defined by the block includes depth planes for which the difference in depth values between corresponding pixels satisfy the predefined threshold. For example, a 2D grid may be divided into blocks, such as blocks sized to be 16 pixels×16 pixels, the apparatus, such as the processing circuitry, may add the differences in depth values for each pixel within the block and then compare the resulting sum representing the cumulative difference in depth values to the predefined threshold. In an instance in which the cumulative difference in the depth values exceeds the predefined threshold, an area for which a sub patch is to be generated is identified, while those blocks for which the cumulative difference in depth values fails to satisfy the predefined threshold, such as by being less than the predefined threshold, are not identified as an area for which a sub patch is to be generated. In the foregoing example, Area 1 of FIG. 10 was identified in accordance with this example embodiment that evaluates differences in pixel values for the pixels of a block of the 2D grid. In an example embodiment, the apparatus, such as the processing circuitry, is configured to combine adjacent or neighboring blocks that are also separately identified to have a cumulative difference in the depth values that exceed the predefined threshold such that all adjacent or adjoining blocks that are separately determined to have a cumulative difference in depth values that exceeds the predefined threshold are grouped together and identified as a single area for which a sub block is to be generated.

In an alternative embodiment, the apparatus 30, such as the processing circuitry 32, is configured to identify one or more areas within a respective patch for which a sub patch is to be generate by utilizing contour based sub patch generation as shown, for example, in FIG. 11. In this example embodiment, the apparatus includes means, such as the processing circuitry or the like, for identifying one or more pixels within the respective patch for which the difference in the depth values of the different depth planes satisfies a predefined threshold. See block 50 of FIG. 11 and, in more detail, block 70 of FIG. 12. In this regard, the apparatus, such as the processing circuitry, can evaluate the pixels of the patch on a pixel-by-pixel basis and can compare the depth values associated with corresponding pixels of the different depth planes in order to identify those pixels for which the difference in depth values satisfies the predefined threshold, such as by exceeding the predefined threshold. In one example embodiment, the differences in the depth values are scaled so as to be represented by 0, 1, 2 or 3 with a difference of 0 representing no difference in depth values between the different depth planes, a difference of 1 representing a rounding error between the original volumetric video data point and the projection thereof, and difference values of 2 and 3 representing more significant differences in depth values that satisfy the predefined threshold.

By way of illustration, FIG. 13 provides an image of a respective patch in which the pixels have a brightness that is associated with the difference in depth values between the depth planes at the corresponding pixel. In this regard, lower differences, such as a difference of 0, are darker, while greater differences, such as a difference of 3, are brighter. After eliminating the pixels from the image of the patch that do not satisfy the predefined threshold, such as eliminating pixels having a difference of 0 or 1, the resulting image of the patch that depicts those pixels for which the difference in depth values of the different depth planes do satisfy the predefined threshold is shown in FIG. 14. The apparatus 30 of an example embodiment also includes means, such as the processing circuitry 32 or the like, for filtering the pixels that were identified for which the difference in depth values of the different depth planes satisfy the predefined threshold so as to eliminate single, outlier pixels that are not surrounded by other pixels. See block 72 of FIG. 12. For example, the pixels may be filtered by an erode function as indicated by block 52 of FIG. 11.

The apparatus 30 of an example embodiment also includes means, such as the processing circuitry 32 or the like, for filling one or more holes between the pixels that were identified for which the difference in the depth values of the different depth planes satisfies the predefined threshold. See block 74 of FIG. 12. By filling these holes, one or more areas within the respective patch are created with the areas representative of areas for which the difference in depth values between the different depth planes satisfy the predetermined threshold. For example, the holes within the image may be filled by a closing function as per block 54 of FIG. 11. In addition, the apparatus, such the processing circuitry, of an example embodiment may also introduce a blurring function, such as by introducing a Gaussian blur, in order to extend the surface and fill more holes. See block 56 of FIG. 11. In an example embodiment, the apparatus also includes means, such as the processing circuitry or the like, for thresholding the one or more pixels after filling one or more holes such that the pixels have one of only two values. See block 58 of FIG. 11 and block 76 of FIG. 12. For example, in an embodiment in which the pixels initially have 256 different values ranging from 0 to 255, the apparatus, such as the processing circuitry, may threshold the pixels so that any pixel having a values of 0 continues to have a value of 0, but any pixel that has any other non-zero value is changed to have a value of 255. As such, the resulting area for which differences in depth values between the different depth planes exceed the predefined threshold have been identified may be depicted from the foregoing example as shown in FIG. 15. See also block 60 of FIG. 11.

Following transmission and/or storage of the resulting encoded image, the image may be decoded, such as for display or other presentation. The image may be decoded by an apparatus 30 that is embodied by the same apparatus as that which encoded the volumetric video data as described above, such as a video codec or other computing device, or by a different device, such as a VR, AR or MR system, such as a VR, AR or MR headset, capable of receiving one or more data streams and rendering visual and audiovisual content that can be presented to a user. Regardless, the apparatus that is configured to decode the resulting image may be configured, such as shown in FIG. 8, to perform the operation depicted in FIG. 16. Optionally, in some embodiments in which the apparatus is configured to process the compressed representation and render the volumetric video datasual content in the form of video or image files, the apparatus configured to decode the resulting image may also include a user interface that may, in turn, be in communication with the processing circuitry 32 to provide output to the user, such as by rendering the visual content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 34, and/or the like).

In this example embodiment, the apparatus 30 of this example embodiment includes means, such as the processing circuitry 32, the communication interface 36, the memory 34 or the like, for receiving an image, such as an encoded and/or compressed image in which volumetric video data has been encoded as a plurality of patches and sub patches projected onto a 2D grid. In this example embodiment, the apparatus also includes means, such as the processing circuitry or the like, for decoding one or more patches that fail to include parent patch information identifying a respective patch from which the one or more patches were generated. See block 80 of FIG. 16. Thus, the metadata associated with a patch is evaluated to determine if the metadata includes parent patch information that would indicate that the patch is, in fact, a sub patch or another patch.

In an instance in which the metadata associated with a patch does not include parent patch information, the patch is decoded in a conventional manner. However, for each of a plurality of pixels of a sub patch that does include parent patch information as well as sub patch location information that identifies the location of the sub patch in relation to the respective patch from which the sub patch was generated, the apparatus 30 includes means, such as the processing circuitry 32 or the like, for comparing depth values of the pixel of the sub patch and a corresponding pixel of the patch from which the sub patch was generated to determine a difference therebetween. See block 82 of FIG. 16. Thus, a sub patch is compared on a pixel-by-pixel basis with the corresponding portion of the patch from which the sub patch was generated and the difference in pixel values between the sub patch and the corresponding portion of the patch is determined.

In an instance in which the difference satisfies a predefined threshold indicative of a variation therebetween, the apparatus 30 includes means, such as the processing circuitry 32 or the like, for decoding the pixel of the sub patch. See block 84 of FIG. 16. Thus, in an example embodiment in which the difference between the pixel values exceeds a predefined threshold and, as such, is considered significant, the corresponding pixel of the sub patch is decoded. However, in an instance in which the difference fails to satisfy the predefined threshold, such as in an instance in which the difference between the pixel values is smaller, the apparatus includes means, such as the processing circuitry or the like, for discarding the pixel of the sub patch without decoding the pixel as shown in block 86 of FIG. 16, thereby increasing the efficiency with which the resulting image is decoded by only decoding those subpixels that provide meaningful information regarding differences with respect to corresponding pixels of the patch that has been or will be decoded. The result from the decoding of the patch and certain sub patches is then combined and the resulting image may be presented, displayed, stored or the like.

As noted above with respect to the encoding process, a single image is therefore encoded and correspondingly decoded that includes information from each of the plurality of the depth planes including the different depth information or at least that depth information that is material so as to increase the efficiency of the encoding and decoding processes. As the volumetric video data typically includes both geometry and texture, the encoding process may encode a single image representative of both depth planes for the geometry and a single image representing both depth planes for the texture and, in some embodiments, an image of the occupancy map. Correspondingly, the decoder may decode a single image representative of both depth planes for the geometry and a single image representative of both depth planes for the texture.

As described above, FIGS. 7, 9, 12 and 16 are flowcharts of an apparatus 30, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by processing circuitry 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

Some embodiments have been described above in relation to omnidirectional video and/or viewport adaptive streaming. It needs to be understood that embodiments generally apply to any type of video and/or generally to any type of video streaming.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    decoding one or more patches that fail to include parent patch information identifying a respective patch from which the one or more patches were generated;
    for a pixel of a plurality of pixels of a sub patch that includes the parent patch information and sub patch location information that identifies a location of the sub patch in relation to the respective patch from which the sub patch was generated, comparing depth values of the pixel of the sub patch and a corresponding pixel of the respective patch from which the sub patch was generated to determine a difference therebetween;
    in an instance in which the difference satisfies a predefined threshold indicative of a variation therebetween, decoding the pixel of the sub patch; and
    in an instance in which the difference fails to satisfy the predefined threshold, discarding the pixel of the sub patch without decoding.

2. The method according to claim 1, wherein the one or more patches are decoded from an image, wherein the image is based upon a mapping of the one or more patches to a grid.

3. The method according to claim 2, wherein the grid is comprised of a plurality of blocks.

4. The method according to claim 1, wherein at least one of the one or more patches is associated with metadata including children information that identifies one or more sub patches that are generated from the at least one patch.

5. An apparatus comprising at least one processor and at least one non-transitory memory including computer program code for one or more programs, the at least one memory and the computer program code configured to, with the at least one processor, cause the apparatus at least to:
    decode one or more patches that fail to include parent patch information identifying a respective patch from which the one or more patches were generated;

for a pixel of a plurality of pixels of a sub patch that includes the parent patch information and sub patch location information that identifies a location of the sub patch in relation to the respective patch from which the sub patch was generated, compare depth values of the pixel of the sub patch and a corresponding pixel of the respective patch from which the sub patch was generated to determine a difference therebetween;

in an instance in which the difference satisfies a predefined threshold indicative of a variation therebetween, decode the pixel of the sub patch; and in an instance in which the difference fails to satisfy the predefined threshold, discard the pixel of the sub patch without decoding.

6. The apparatus according to claim 5, wherein the one or more patches are decoded from an image, wherein the image is based upon a mapping of the one or more patches to a grid.

7. The apparatus according to claim 6, wherein the grid is comprised of a plurality of blocks.

8. The apparatus according to claim 5, wherein at least one of the one or more patches is associated with metadata including children information that identifies one or more sub patches that are generated from the at least one patch.

9. A non-transitory computer-readable medium comprising program instructions stored thereon for performing at least the following:

decoding one or more patches that fail to include parent patch information identifying a respective patch from which the one or more patches were generated;

for a pixel of a plurality of pixels of a sub patch that includes the parent patch information and sub patch location information that identifies a location of the sub patch in relation to the respective patch from which the sub patch was generated, comparing depth values of the pixel of the sub patch and a corresponding pixel of the respective patch from which the sub patch was generated to determine a difference therebetween;

in an instance in which the difference satisfies a predefined threshold indicative of a variation therebetween, decoding the pixel of the sub patch; and in an instance in which the difference fails to satisfy the predefined threshold, discarding the pixel of the sub patch without decoding.

10. The non-transitory computer-readable medium of claim 9, wherein the one or more patches are decoded from an image, wherein the image is based upon a mapping of the one or more patches to a grid.

11. The non-transitory computer-readable medium of claim 10, wherein the grid is comprised of a plurality of blocks.

12. The non-transitory computer-readable medium of claim 9, wherein at least one of the one or more patches is associated with metadata including children information that identifies one or more sub patches that are generated from the at least one patch.

* * * * *